United States Patent
Kakehi

(10) Patent No.: US 7,363,061 B2
(45) Date of Patent: Apr. 22, 2008

(54) INFORMATION REGISTERING AND RETRIEVING SYSTEM, IN-VEHICLE APPARATUS AND PORTABLE APPARATUS

(75) Inventor: Tooru Kakehi, Toyoake (JP)

(73) Assignee: DENSO Corporation, Kariya (JP)

( * ) Notice: Subject to any disclaimer, the term of this patent is extended or adjusted under 35 U.S.C. 154(b) by 479 days.

(21) Appl. No.: 11/147,474

(22) Filed: Jun. 8, 2005

(65) Prior Publication Data
US 2006/0019720 A1    Jan. 26, 2006

(30) Foreign Application Priority Data
Jun. 9, 2004    (JP) .............................. 2004-171124

(51) Int. Cl.
H04M 1/00    (2006.01)
(52) U.S. Cl. .............................. 455/569.2; 455/569.1; 455/435.1; 340/426.1; 340/426.16
(58) Field of Classification Search ............ 455/569.1, 455/569.2, 410, 411, 412.1, 424, 425, 456.5, 455/456.6, 550.1, 575.1, 555, 556.1, 557, 455/575.9, 99, 344, 345, 152.1, 435.1, 41.2, 455/415; 340/426.1, 426.16, 902, 426.2, 340/426.36, 426.13, 426.26; 379/142.06, 379/142.05, 420.04, 428.02
See application file for complete search history.

(56) References Cited

U.S. PATENT DOCUMENTS

| | | | | |
|---|---|---|---|---|
| 4,593,155 | A * | 6/1986 | Hawkins | 455/411 |
| 6,011,320 | A * | 1/2000 | Miyamoto et al. | 307/10.2 |
| 6,275,143 | B1 * | 8/2001 | Stobbe | 340/10.34 |
| 6,480,121 | B1 * | 11/2002 | Reimann | 340/990 |
| 6,542,758 | B1 * | 4/2003 | Chennakeshu et al. | 455/569.2 |
| 7,106,171 | B1 * | 9/2006 | Burgess | 340/5.72 |
| 7,242,966 | B1 * | 7/2007 | Averkamp | 455/564 |
| 2001/0023485 | A1 * | 9/2001 | Yashiki et al. | 713/194 |
| 2003/0003892 | A1 * | 1/2003 | Makinen | 455/345 |
| 2003/0114202 | A1 * | 6/2003 | Suh et al. | 455/569 |
| 2003/0162497 | A1 * | 8/2003 | Curtiss et al. | 455/41 |
| 2004/0185842 | A1 * | 9/2004 | Spaur et al. | 455/420 |

(Continued)

FOREIGN PATENT DOCUMENTS

JP    2002-368876    12/2002

(Continued)

OTHER PUBLICATIONS

Search Report from corresponding FR application.

*Primary Examiner*—Edward F. Urban
*Assistant Examiner*—Charles Chow
(74) *Attorney, Agent, or Firm*—Harness, Dickey & Pierce, PLC

(57) ABSTRACT

When an in-vehicle apparatus receives an information retrieval request from a portable cellular phone along with a phone ID of the cellular phone, a link key is generated in the in-vehicle apparatus based on the phone ID and an apparatus ID of the in-vehicle apparatus. When the link key coincides with a previously generated link key that is associated with information stored in the in-vehicle apparatus, the in-vehicle apparatus permits the cellular phone to retrieve only the associated information, which is stored in the in-vehicle apparatus and is associated with the previously generated link key, so that retrieval of information other than the associated information from the in-vehicle apparatus by the cellular phone is prohibited.

10 Claims, 4 Drawing Sheets

U.S. PATENT DOCUMENTS

| | | | |
|---|---|---|---|
| 2005/0179540 A1* | 8/2005 | Rubenstein | 340/539.18 |
| 2006/0052141 A1* | 3/2006 | Suzuki | 455/569.1 |
| 2006/0148533 A1* | 7/2006 | Tanneberger et al. | 455/569.1 |
| 2006/0190097 A1* | 8/2006 | Rubenstein | 700/17 |
| 2006/0255910 A1* | 11/2006 | Fukushima et al. | 340/5.65 |
| 2007/0072650 A1* | 3/2007 | Matsuda | 455/569.2 |

FOREIGN PATENT DOCUMENTS

| | | | |
|---|---|---|---|
| JP | 2004-140731 | * | 5/2004 |
| JP | 2005142663 | * | 6/2006 |
| WO | WO 2005/046190 | | 5/2005 |

* cited by examiner

INFORMATION REGISTERING AND RETRIEVING SYSTEM, IN-VEHICLE APPARATUS AND PORTABLE APPARATUS

CROSS REFERENCE TO RELATED APPLICATION

This application is based on and incorporates herein by reference Japanese Patent Application No. 2004-171124 filed on Jun. 9, 2004.

BACKGROUND OF THE INVENTION

1. Field of the Invention

The present invention relates to an information registering and retrieving system of a vehicle, which includes a portable apparatus and an in-vehicle apparatus.

2. Description of Related Art

According to a previously proposed technique, upon establishment of a connection between a portable cellular phone and an in-vehicle apparatus (an in-vehicle handsfree apparatus or an in-vehicle navigation apparatus), when a user performs a predetermined phone number registration operation on the cellular phone, phone number information, which is stored as a phone book in the cellular phone, is registered in the in-vehicle apparatus. When the user performs a predetermined phone number retrieving operation on the cellular phone, the phone number information, which is registered as the phone book in the in-vehicle apparatus, is transmitted from the in-vehicle apparatus to the cellular phone and is displayed on the cellular phone (see, for example, Japanese Unexamined Patent Publication No. 2002-368876).

In the above in-vehicle apparatus, the phone number information, which is transmitted from the cellular phone, is registered as the phone book regardless of which cellular phone has transmitted the phone number information. Thus, when the cellular phone, which has registered its phone number information in the in-vehicle apparatus, is connected to the in-vehicle apparatus, the phone number information, which is registered from the cellular phone, can be retrieved from the cellular phone. However, when a different cellular phone, which is different from the above cellular phone that has registered its phone number information in the in-vehicle apparatus, is connected to the in-vehicle apparatus, the different cellular phone can retrieve the phone number information of the other cellular phone. Therefore, for example, when the user asks a doorman of a hotel to drive his vehicle to a parking of the hotel, the doorman could connect his cellular phone to the in-vehicle apparatus and could perform unauthorized retrieval of the phone number information, which is registered by the user as the phone book in the in-vehicle apparatus. As a result, in such a case, it is difficult to secure the information stored in the in-vehicle apparatus.

SUMMARY OF THE INVENTION

The present invention addresses the above disadvantage. Thus, it is an objective of the present invention to provide an information registering and retrieving system that limits unauthorized access to registered information of an in-vehicle apparatus, which has been registered from a portable apparatus. It is another objective of the present invention to provide the in-vehicle apparatus for such a system. It is a further objective of the present invention to provide the portable apparatus for such a system.

To achieve the objectives of the present invention, there is provided an information registering and retrieving system for a vehicle. The information registering and retrieving system includes a portable apparatus and an in-vehicle apparatus. The portable apparatus includes a storage means and a control means. The storage means is for storing information. The control means is for controlling the storage means. The in-vehicle apparatus communicates with the portable apparatus and includes a link key generating means, a storage means and a control means. The link key generating means is for generating a link key based on an in-vehicle apparatus ID of the in-vehicle apparatus and a portable apparatus ID of the portable apparatus, which is transmitted from the portable apparatus. The storage means is for storing the information, which is transmitted from the portable apparatus. The control means is for controlling the link key generating means and the storage means of the in-vehicle apparatus. When the control means of the in-vehicle apparatus receives an information registration request from the portable apparatus along with the information and the link key, which has been previously generated by the link key generating means of the in-vehicle apparatus and has been previously transmitted to the portable apparatus, the control means of the in-vehicle apparatus operates the storage means of the in-vehicle apparatus to store the information in association with the link key. When the control means of the in-vehicle apparatus receives an information retrieval request from the portable apparatus along with the portable apparatus ID, the control means of the in-vehicle apparatus operates the link key generating means to generate a new link key based on the portable apparatus ID and the in-vehicle apparatus ID. When the new link key coincides with the previously generated link key that is associated with the information stored in the storage means of the in-vehicle apparatus, the control means of the in-vehicle apparatus permits the portable apparatus to retrieve only the associated information, which is stored in the storage means of the in-vehicle apparatus and is associated with the previously generated link key, so that retrieval of information other than the associated information from the storage means of the in-vehicle apparatus by the portable apparatus is prohibited.

To achieve the objectives of the present invention, there is also provided an in-vehicle apparatus of an information registering and retrieving system for a vehicle. A portable apparatus of the information registering and retrieving system communicates with the in-vehicle apparatus and stores information. The in-vehicle apparatus includes a link key generating means, a storage means and a control means. The link key generating means is for generating a link key based on an in-vehicle apparatus ID of the in-vehicle apparatus and a portable apparatus ID of the portable apparatus, which is transmitted from the portable apparatus. The storage means is for storing the information, which is transmitted from the portable apparatus. The control means is for controlling the link key generating means and the storage means. When the control means receives an information registration request from the portable apparatus along with the information and the link key, which has been previously generated by the link key generating means and has been previously transmitted to the portable apparatus, the control means operates the storage means to store the information in association with the link key. When the control means receives an information retrieval request from the portable apparatus along with the portable apparatus ID, the control means operates the link key generating means to generate a new link key based on the portable apparatus ID and the in-vehicle apparatus ID.

When the new link key coincides with the previously generated link key that is associated with the information stored in the storage means, the control means permits the portable apparatus to retrieve only the associated information, which is stored in the storage means of the in-vehicle apparatus and is associated with the previously generated link key, so that retrieval of information other than the associated information from the storage means by the portable apparatus is prohibited.

To achieve the objectives of the present invention, there is also provided a portable apparatus of an information registering and retrieving system for a vehicle. An in-vehicle apparatus of the information registering and retrieving system communicates with the portable apparatus. The portable apparatus includes a storage means and a control means. The storage means is for storing information. The control means is for controlling the storage means. At time of requesting registration of the information, which is stored in the storage means, to the in-vehicle apparatus, the control means transmits an information registration request to the in-vehicle apparatus along with the information and a link key, which has been generated by the in-vehicle apparatus based on a portable apparatus ID of the portable apparatus and an in-vehicle apparatus ID of the in-vehicle apparatus and has been previously transmitted to the portable apparatus. At time of requesting retrieval of the information from the in-vehicle apparatus, the control means transmits an information retrieval request to the in-vehicle apparatus along with the portable apparatus ID.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 2:
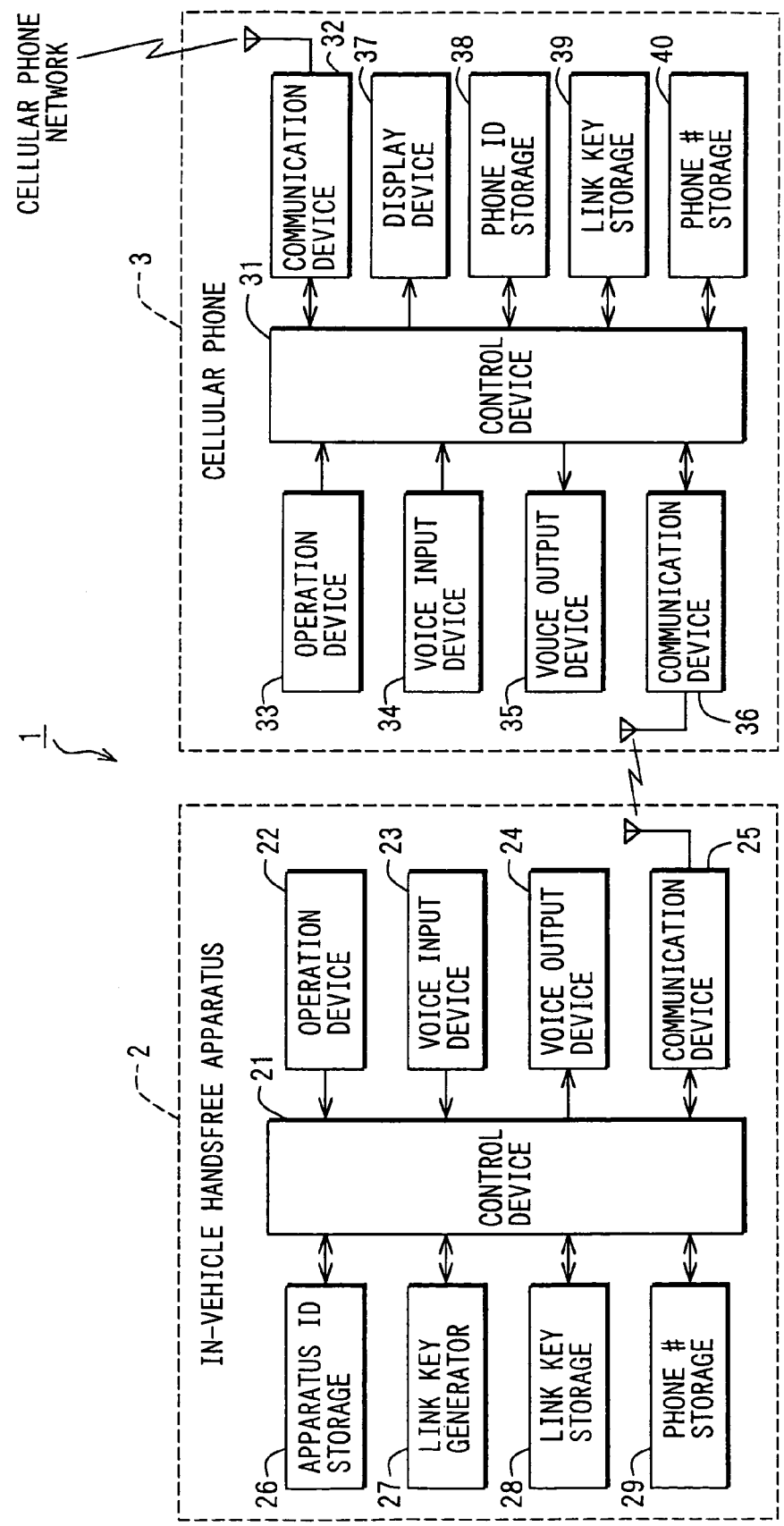
FIG. 2 is a diagram showing a schematic structure of the in-vehicle handsfree apparatus and a schematic structure of the portable cellular phone.

An embodiment of the present invention will be described with reference to the accompanying drawings. In the present embodiment, an in-vehicle handsfree apparatus is provided as an in-vehicle apparatus of the present invention, and a portable cellular phone is provided as a portable apparatus of the present invention. Furthermore, phone number information is used as information of the present invention. FIG. 2 schematically shows an entire structure of an information registering and retrieving system for a vehicle.

The information registering and retrieving system 1 includes the in-vehicle handsfree apparatus 2 and the portable cellular phone 3. The cellular phone 3 can communicate information, such as the phone number information, with the handsfree apparatus 2. In this case, the connection between the in-vehicle handsfree apparatus 2 and the cellular phone 3 may be established by wireless communication or wire communication. The wireless communication may include, for example, wireless LAN communication or Bluetooth (registered trademark) communication. The wire communication may be cable communication. In the following description, the case of the wireless communication between the in-vehicle handsfree apparatus 2 and the cellular phone 3 will be described.

The in-vehicle handsfree apparatus 2 includes a control device 21, an operation device 22, an outgoing-call voice input device 23, an incoming-call voice output device 24, a narrow-band wireless communication device 25, an apparatus ID storage 26, a link key generator 27, a link key storage 28 and a phone number storage 29. The control device 21 controls an entire operation of the in-vehicle handsfree apparatus 2. The operation device 22 for operating the in-vehicle handsfree apparatus 2 includes a plurality of keys, through which a user can operate the in-vehicle handsfree apparatus 2. The voice input device 23 receives voice of the user as the outgoing-call voice. The voice output device 24 outputs the voice, which is received by the cellular phone 3 through the cellular phone network, as the incoming-call voice. The narrow-band wireless communication device 25 performs the narrow-band wireless communication (or the Dedicated Short Range Communication abbreviated as DSRC) with the cellular phone 3. The apparatus ID storage 26 stores an in-vehicle handsfree apparatus ID (an in-vehicle apparatus ID), which is specific to the in-vehicle handsfree apparatus 2. The link key generator 27 generates a link key. The link key storage 28 stores the link key. The phone number storage 29 stores phone number information, which includes various phone numbers. In this particular example, the control device 21 has a voice processing function for controlling, for example, a gain of the outgoing-call voice and/or of the incoming-call voice.

The cellular phone 3 includes a control device 31, a wireless communication device 32, an operation device 33, an outgoing-call voice input device 34, an incoming-call voice output device 35, a narrow-band wireless communication device 36, a display device 37, a phone ID storage 38, a link key storage 39 and a phone number storage 40. The control device 31 controls an entire operation of the cellular phone 3. The wireless communication device 32 performs wireless communication with the cellular phone network. The operation device 33 for operating the cellular phone 3 includes a plurality of keys, through which the user can operate the cellular phone 3. The voice input device 34 receives voice of the user as the outgoing-call voice. The voice output device 35 outputs the voice, which is received through the cellular phone network, as the incoming-call voice. The narrow-band wireless communication device 36 performs the narrow-band wireless communication (or the Dedicated Short Range communication abbreviated as DSRC) with the narrow-band wireless communication device 25 of the in-vehicle handsfree apparatus 3. The display device 37 displays information, such as the phone number information. The phone ID storage 38 stores a cellular phone ID (a portable apparatus ID), which is specific to the cellular phone 3. The link key storage 39 stores the link key. The phone number storage 40 stores the phone number information.

Figure 3:
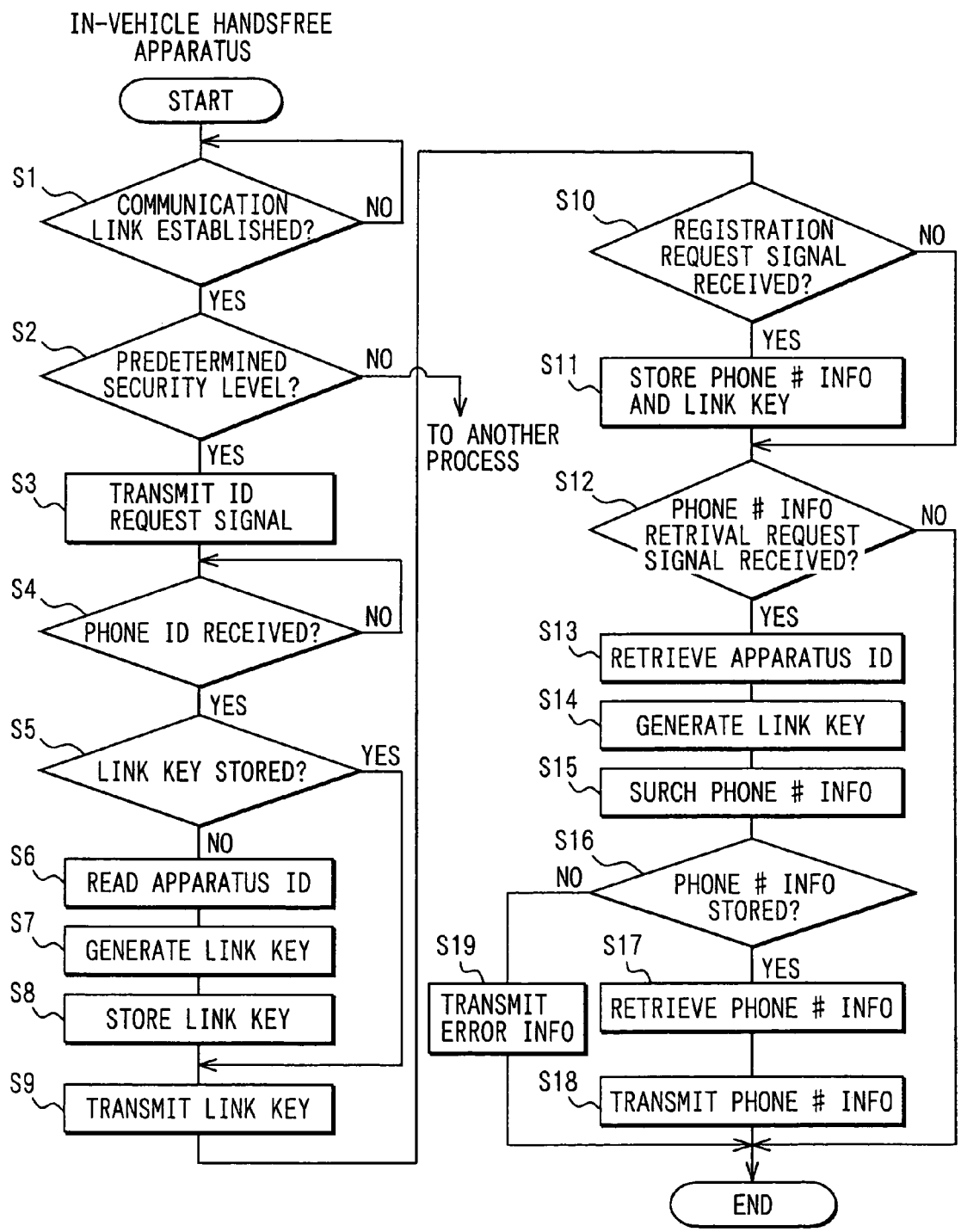
FIG. 3 is a flowchart showing the process performed by the in-vehicle handsfree apparatus.
Figure 4:
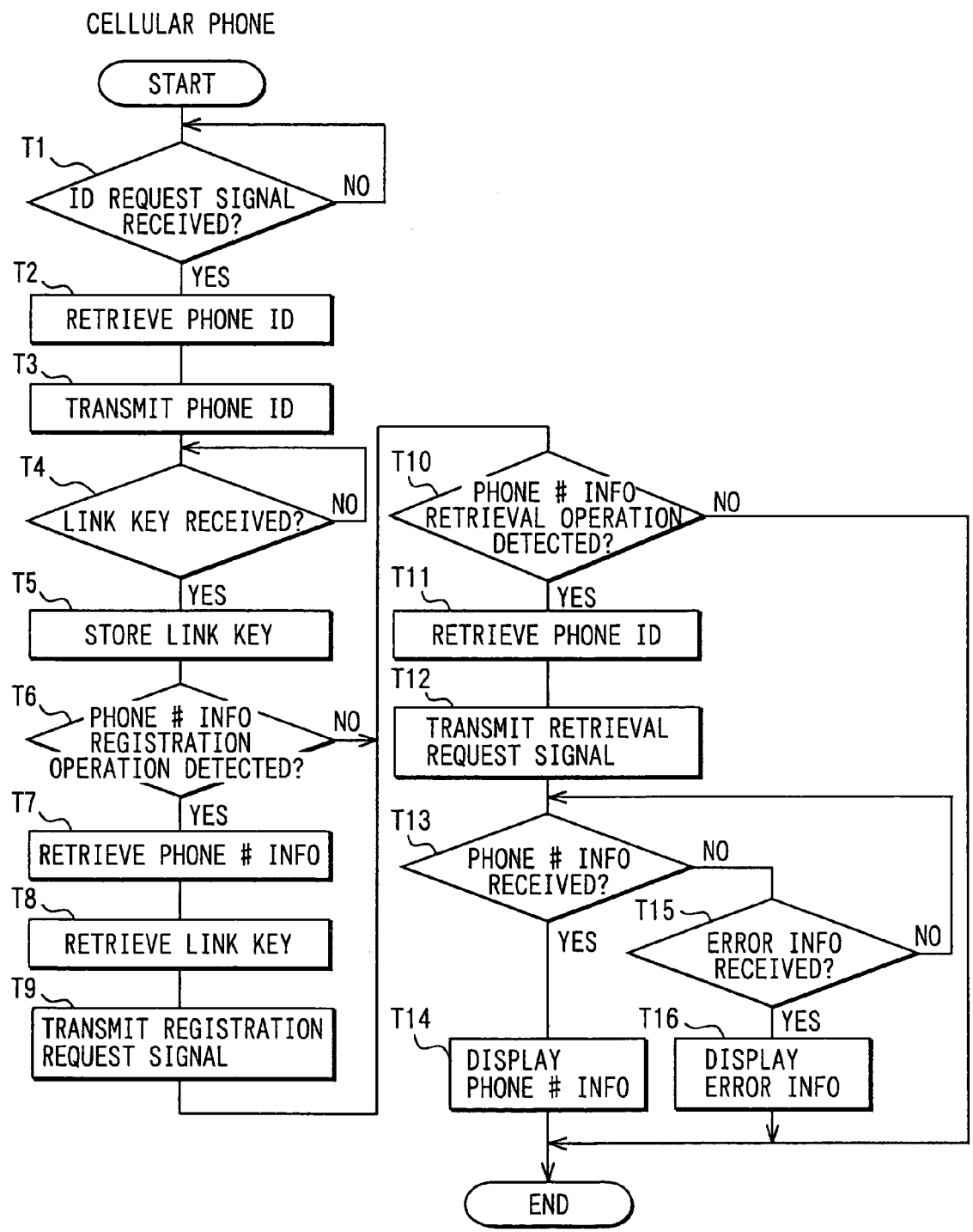
FIG. 4 is a flowchart showing the process performed by the portable cellular phone.

Next, the above-described structure will be described in greater detail with reference to FIGS. 1, 3 and 4. FIG. 3 is a flowchart showing a process, which is executed by the in-vehicle handsfree apparatus 2. FIG. 4 is a flowchart showing a process, which is executed by the cellular phone 3. In this case, it is assumed that the in-vehicle handsfree apparatus 2 and the cellular phone 3 are constructed to automatically establish the narrow-band wireless communication link (or the Dedicated Short Range Communication link) therebetween, for example, when the cellular phone 3 is brought into an interior of a passenger room of the vehicle, so that a distance between the in-vehicle handsfree apparatus 2 and the cellular phone 3 is equal to or less than a predetermined distance (e.g., several tens of centimeters) Furthermore, in this case, it is assumed that the user sets one of a plurality of security levels in advance over the in-vehicle handsfree apparatus 2 and the cellular phone 3.

In the in-vehicle handsfree apparatus 2, when the establishment of the narrow-band wireless communication link between the cellular phone 3 and the in-vehicle handsfree apparatus 2 is detected upon entering of the cellular phone 3 into the passenger room of the vehicle (YES at step S1), the control device 21 determines whether the current security level, which is set at the time of detecting the establishment of the narrow-band wireless communication, is a predetermined one of the security levels (step S2). When it is determined that the current security level is the predetermined security level (YES at step S2), the control device 21 transmits an ID request signal from the narrow-band wireless communication device 25 to the cellular phone 3 (step S3).

In the cellular phone 3, when it is determined that the ID request signal, which is transmitted from the in-vehicle handsfree apparatus 2, is received by the narrow-band wireless communication device 36 (YES at step T1), the control device 31 retrieves its cellular phone ID from the phone ID storage 38 (step T2) and transmits the retrieved phone ID from the narrow-band communication device 36 to the in-vehicle handsfree device 2 (step T3).

In the in-vehicle handsfree apparatus 2, when it is determined that the phone ID, which is transmitted from the cellular phone 3, is received by the narrow-band wireless communication device 25 (YES at step S4), the control device 21 determines whether a link key, which corresponds to the received phone ID, already exists in the link key storage 28 (step S5). When it is determined that the link key, which corresponds to the received phone ID, does not exist in the link key storage 28 (NO at step S5), the control device 21 retrieves an in-vehicle handsfree apparatus ID from the apparatus ID storage 26 (step S6) and generates a new link key in the link key generator 27 through computation using a predetermined algorism based on the received phone ID and the retrieved in-vehicle handsfree apparatus ID (step S7).

Next, the control device 21 stores the newly generated link key in the link key storage 28 (step S8) and transmits the newly generated link key from the narrow-band communication device 25 to the cellular phone 3 (step S9). In contrast, when the control device 21 determines that the link key, which corresponds to the received phone ID, is already stored in the link key storage 28 (YES at step S5), the control device 21 transmits the corresponding stored link key from the narrow-band wireless communication device 25 to the cellular phone 3 (step S9).

In the cellular phone 3, when it is determined that the link key, which is transmitted from the in-vehicle handsfree device 2, is received by the narrow band wireless communication device 36 (YES at step T4), the control device 31 stores the received link key in the link key storage 39 (step T5).

In the following description, it is assumed that the user operates the cellular phone 3 to register the phone number information (phone book registration operation). When it is determined that the user has operated the cellular phone to register the phone number information (YES at step T6), the control device 31 retrieves the phone number information, the registration of which is instructed by the user, from the phone number storage 40 (step T7). Also, the control device 31 retrieves the link key from the link key storage 39 (step T8). Then, the control device 31 transmits a registration request signal, which includes the retrieved phone number information and the retrieved link key, from the narrow-band wireless communication device 36 to the in-vehicle handsfree apparatus 2 (step T9).

In the in-vehicle handsfree apparatus 2, when it is determined that the registration request signal, which is transmitted from the cellular phone 3, is received by the narrow-band communication apparatus 25 (YES at step S10), the control device 21 extracts the phone number information and the link key from the received registration request signal and stores the extracted phone number information in the phone number storage 29 while associating the extracted phone number information with the extracted link key (step S11).

Next, in the following description, it is assumed that the user operates the cellular phone 3 to retrieve, i.e., read or see the registered phone number information, which is registered in the in-vehicle handsfree apparatus 2 (phone book retrieval operation). When it is determined that the user has operated the cellular phone 3 to retrieve the phone number information (YES at step T10), the control device 31 retrieves the phone ID from the phone ID storage 38 (step T11) and transmits a retrieval request signal, which includes the retrieved phone ID, to the in-vehicle handsfree apparatus 2 through the narrow-band wireless communication device 36 (step T12).

In the in-vehicle handsfree apparatus 2, when it is determined that the retrieval request signal, which is transmitted from the cellular phone 3, is received by the narrow-band wireless communication device 25 (YES at step S12), the control device 21 extracts the link key from the retrieval request signal and retrieves the in-vehicle handsfree apparatus ID from the apparatus ID storage 26 (step S13). Then, the control device 21 generates a new link key in the link key generator 27 through use of the predetermined algorithm based on the extracted phone ID and the retrieved in-vehicle handsfree apparatus ID (step S14). The control device 21 searches the phone number information, which is stored in the phone number storage 29, with reference to the generated link key (step S15), and the control device 21 determines whether the phone number information, which is associated with the generated link key, is stored in the phone number storage 29 (step S16). In other words, the control device 21 determined whether the new link key coincides with any of the previously generated link key(s) associated with the phone number information.

Here, when it is determined that the cellular phone 3, which has previously transmitted the registration request signal to the in-vehicle handsfree apparatus 2, is the same as the cellular phone 3, which has currently transmitted the retrieval request signal to the in-vehicle handsfree apparatus 2, that is, when the cellular phone 3, which has requested the registration of the phone number information, is the same as the cellular phone 3, which has requested the retrieval of the phone number information, the phone number information, which is associated with the link key, should be stored in the phone number storage 29. Thus, when it is determined that the phone number information, which is associated with the link key, is stored in the phone number storage device 29 (YES at step S16), the control device 21 retrieves the corresponding phone number information from the phone number storage 29 (step S17) and transmits the retrieved phone number information to the cellular phone 3 through the narrow-band wireless communication device 25 (step S18).

In the cellular phone 3, when it is determined that the phone number information, which is transmitted from the in-vehicle handsfree apparatus 2, is received by the narrow-band communication device 36 (YES at step T13), the control device 31 displays the received phone number information on the display device 37 (step T14). In this way, the user can retrieve and see the phone number information, which has been registered by the user.

In contrast, in the in-vehicle handsfree apparatus 2, when the cellular phone 3, which has previously transmitted the registration request signal to the in-vehicle handsfree apparatus 2, is different from the cellular phone, which has currently transmitted the retrieval request signal, that is, when the cellular phone 3, which has requested the registration of the phone number information, is different from the cellular phone 3, which has requested the retrieval of the phone number information, the phone number information, which is associated with the link key, should not be stored in the phone number storage 29. Thus, when it is determined that the phone number information, which is associated with the link key, is not stored in the phone number storage 29 (NO at step S16), the control device 21 transmits error information to the cellular phone 3 through the narrow-band wireless communication device 25 (step S19).

Then, in the cellular phone 3, when it is determined that the error information, which is transmitted from the in-vehicle handsfree apparatus 2, is received by the narrow-band wireless communication device 36 (YES at step T15), the control device 31 displays the received error information on the display device 37 (step T16).

In the vehicle handsfree apparatus 2, when it is determined that the security level, which is set at the time of establishing the narrow-band communication link with the cellular phone 3, is not the predetermined security level (NO at step S2), the control device 21 does not perform the above process (the process of registering and retrieving the phone number information through use of the link keys), and the control device 21 performs another process (e.g., a process of registering and retrieving phone number information through use of a simple password without the link keys), which corresponds to another security level that has been set at the time of establishing the narrow-band communication link.

Figure 1:
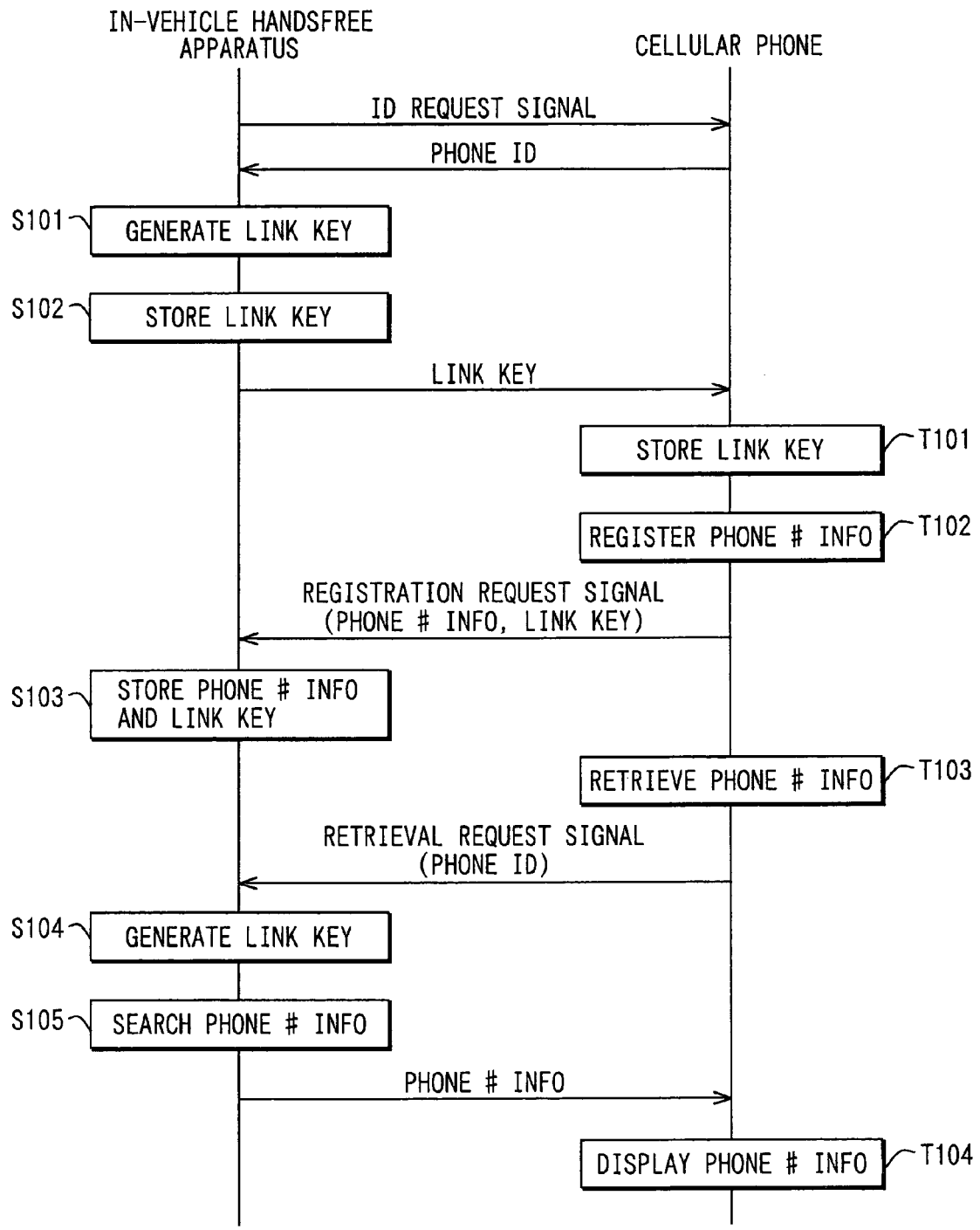
FIG. 1 is a sequence diagram showing processes performed by an in-vehicle handsfree apparatus and a portable cellular phone according to an embodiment of the present invention.

FIG. 1 is a sequence diagram, which indicates the above described process, more specifically the steps (steps S101 to S105) performed by the in-vehicle handsfree apparatus 2 and the steps (T101 to T104) performed by the cellular phone 3 until the displaying of the phone number information.

In the above embodiment, there is described the case where when the cellular phone 3, which has transmitted the information registration request signal, is the same as the cellular phone 3, which has transmitted the information retrieval request signal, the phone number information, which is registered from the cellular phone 3 into the in-vehicle handsfree apparatus 2, is transmitted to the cellular phone 3 and is displayed on the display device 37. Alternatively, the phone number information, which is registered from the cellular phone 3 into the in-vehicle handsfree apparatus 2, may be transmitted to a vehicle navigation apparatus (not shown) and may be displayed on a display device of the vehicle navigation apparatus. Furthermore, in the above embodiment, the phone number information, which is associated with the link key, is displayed on the display device. Alternatively, for example, the phone number information, which is associated with the link key, may be used as a caller phone number to perform a calling operation.

In the above described embodiment, in the in-vehicle handsfree apparatus 2, when the phone number information registration request is received from the cellular phone 3, the link key, which is received from the cellular phone 3, and the phone number information, are stored in association with one another. Then, when the phone number retrieval request is received from the cellular phone 3, the link key is generated based on the phone ID, which is received from the cellular phone 3, and the in-vehicle handsfree apparatus ID. Then, the cellular phone 3 is permitted to retrieve the phone number information, which is stored in association with the generated link key, and the cellular phone 3 is prohibited to retrieve the phone number information, which is stored without the association with the generated link key.

In this way, when the cellular phone 3, which has issued the phone number information registration request, is the same as the cellular phone, which has issued the phone number retrieval request, the cellular phone 3, which has issued the phone number information registration request, is allowed to retrieve the phone number information, which is stored in the in-vehicle handsfree apparatus 2. In contrast, when the cellular phone 3, which has issued the phone number information registration request, is different from the cellular phone, which has issued the phone number retrieval request, the cellular phone 3, which has issued the phone number information registration request, is disallowed to retrieve the phone number information of the other cellular phone, which is stored in the in-vehicle handsfree apparatus 2. Thus, unauthorized leakage of the phone number information, which is stored in the in-vehicle handsfree apparatus 2, to a third party through the cellular phone 3 can be limited in advance, so that security can be appropriately maintained. More specifically, the user of the cellular phone 3 can retrieve the phone number information, which is registered by the same user, and it is possible to limit the unauthorized third party to retrieve the phone number information, which is registered by the user.

The present invention is not limited to the above embodiment, and the above embodiment can be modified as follows.

The in-vehicle apparatus is not limited to the in-vehicle handsfree apparatus. For example, the in-vehicle apparatus can be any other apparatus, such as the vehicle navigation apparatus. Furthermore, the portable apparatus is not limited to the portable cellular phone. The portable apparatus can be a portable information terminal, such as a personal digital assistant (PDA). Furthermore, the information, which is registered from the portable apparatus into the in-vehicle apparatus, is not limited to the phone number information. For example, such information may be any other information, such as personal information, schedule information, historical operational information.

Furthermore, it is possible to set the security level at one of the portable cellular phone and the in-vehicle handsfree apparatus. Also, the setting of the security level may be allowed only when the result of mutual authentication process between the portable cellular phone and the in-vehicle handsfree apparatus is positive. Also, the portable cellular phone may be allowed to transmit the phone ID to the in-vehicle handsfree apparatus right after establishment of the narrow-band communication between the in-vehicle handsfree apparatus and the portable cellular phone.

Additional advantages and modifications will readily occur to those skilled in the art. The invention in its broader terms is therefore not limited to the above specific details.

What is claimed is:

1. An information registering and retrieving system for a vehicle, the information registering and retrieving system comprising:
   a portable apparatus that includes:
      a storage means for storing information; and
      a control means for controlling the storage means; and
   an in-vehicle apparatus that communicates with the portable apparatus and includes:
      a link key generating means for generating a link key based on an in-vehicle apparatus ID of the in-vehicle apparatus and a portable apparatus ID of the portable apparatus, which is transmitted from the portable apparatus;
      a storage means for storing the information, which is transmitted from the portable apparatus; and
      a control means for controlling the link key generating means and the storage means of the in-vehicle apparatus, wherein:
   when the control means of the in-vehicle apparatus receives an information registration request from the portable apparatus along with the information and the link key, which has been previously generated by the link key generating means of the in-vehicle apparatus and has been previously transmitted to the portable apparatus, the control means of the in-vehicle apparatus operates the storage means of the in-vehicle apparatus to store the information in association with the link key;
   when the control means of the in-vehicle apparatus receives an information retrieval request from the portable apparatus along with the portable apparatus ID, the control means of the in-vehicle apparatus operates the link key generating means to generate a new link key based on the portable apparatus ID and the in-vehicle apparatus ID; and
   when the new link key coincides with the previously generated link key that is associated with the information stored in the storage means of the in-vehicle apparatus, the control means of the in-vehicle apparatus permits the portable apparatus to retrieve only the associated information, which is stored in the storage means of the in-vehicle apparatus and is associated with the previously generated link key, so that retrieval of information other than the associated information from the storage means of the in-vehicle apparatus by the portable apparatus is prohibited.

2. The information registering and retrieving system according to claim 1, wherein:
   when a predetermined one of a plurality of security levels is set in at least one of the in-vehicle apparatus and the portable apparatus, the information is registered in and is retrieved from the storage means of the in-vehicle apparatus through use of the link keys; and
   when another one of the plurality of security levels is set in the at least one of the in-vehicle apparatus and the portable apparatus, the information is registered in and is retrieved from the storage means of the in-vehicle apparatus without using the link keys.

3. The information registering and retrieving system according to claim 1, wherein the information includes phone number information.

4. The information registering and retrieving system according to claim 1, wherein:
   the portable apparatus further includes a wireless communicating means for communicating with the in-vehicle apparatus; and
   the in-vehicle apparatus further includes a wireless communicating means for communicating with the wireless communicating means of the portable apparatus.

5. An in-vehicle apparatus of an information registering and retrieving system for a vehicle, wherein a portable apparatus of the information registering and retrieving system communicates with the in-vehicle apparatus and stores information, the in-vehicle apparatus comprising:
   a link key generating means for generating a link key based on an in-vehicle apparatus ID of the in-vehicle apparatus and a portable apparatus ID of the portable apparatus, which is transmitted from the portable apparatus;
   a storage means for storing the information, which is transmitted from the portable apparatus; and
   a control means for controlling the link key generating means and the storage means, wherein:
   when the control means receives an information registration request from the portable apparatus along with the information and the link key, which has been previously generated by the link key generating means and has been previously transmitted to the portable apparatus, the control means operates the storage means to store the information in association with the link key;
   when the control means receives an information retrieval request from the portable apparatus along with the portable apparatus ID, the control means operates the link key generating means to generate a new link key based on the portable apparatus ID and the in-vehicle apparatus ID; and
   when the new link key coincides with the previously generated link key that is associated with the information stored in the storage means, the control means permits the portable apparatus to retrieve only the associated information, which is stored in the storage means of the in-vehicle apparatus and is associated with the previously generated link key, so that retrieval of information other than the associated information from the storage means by the portable apparatus is prohibited.

6. The in-vehicle apparatus according to claim 5, wherein the information includes phone number information.

7. The in-vehicle apparatus according to claim 5, further comprising a wireless communicating means for communicating with the portable apparatus.

8. A portable apparatus of an information registering and retrieving system for a vehicle, wherein an in-vehicle apparatus of the information registering and retrieving system communicates with the portable apparatus, the portable apparatus comprising:
   a storage means for storing information; and
   a control means for controlling the storage means, wherein:
   at time of requesting registration of the information, which is stored in the storage means, to the in-vehicle apparatus, the control means transmits an information registration request to the in-vehicle apparatus along with the information and a link key, which has been generated by the in-vehicle apparatus based on a portable apparatus ID of the portable apparatus and an in-vehicle apparatus ID of the in-vehicle apparatus and has been previously transmitted to the portable apparatus; and at time of requesting retrieval of the information from the in-vehicle apparatus, the control means transmits an information retrieval request to the in-vehicle apparatus along with the portable apparatus ID.

9. The portable apparatus according to claim 8, wherein the information includes phone number information.

10. The portable apparatus according to claim 8, further comprising a wireless communicating means for communicating with the in-vehicle apparatus.

* * * * *